UNITED STATES PATENT OFFICE.

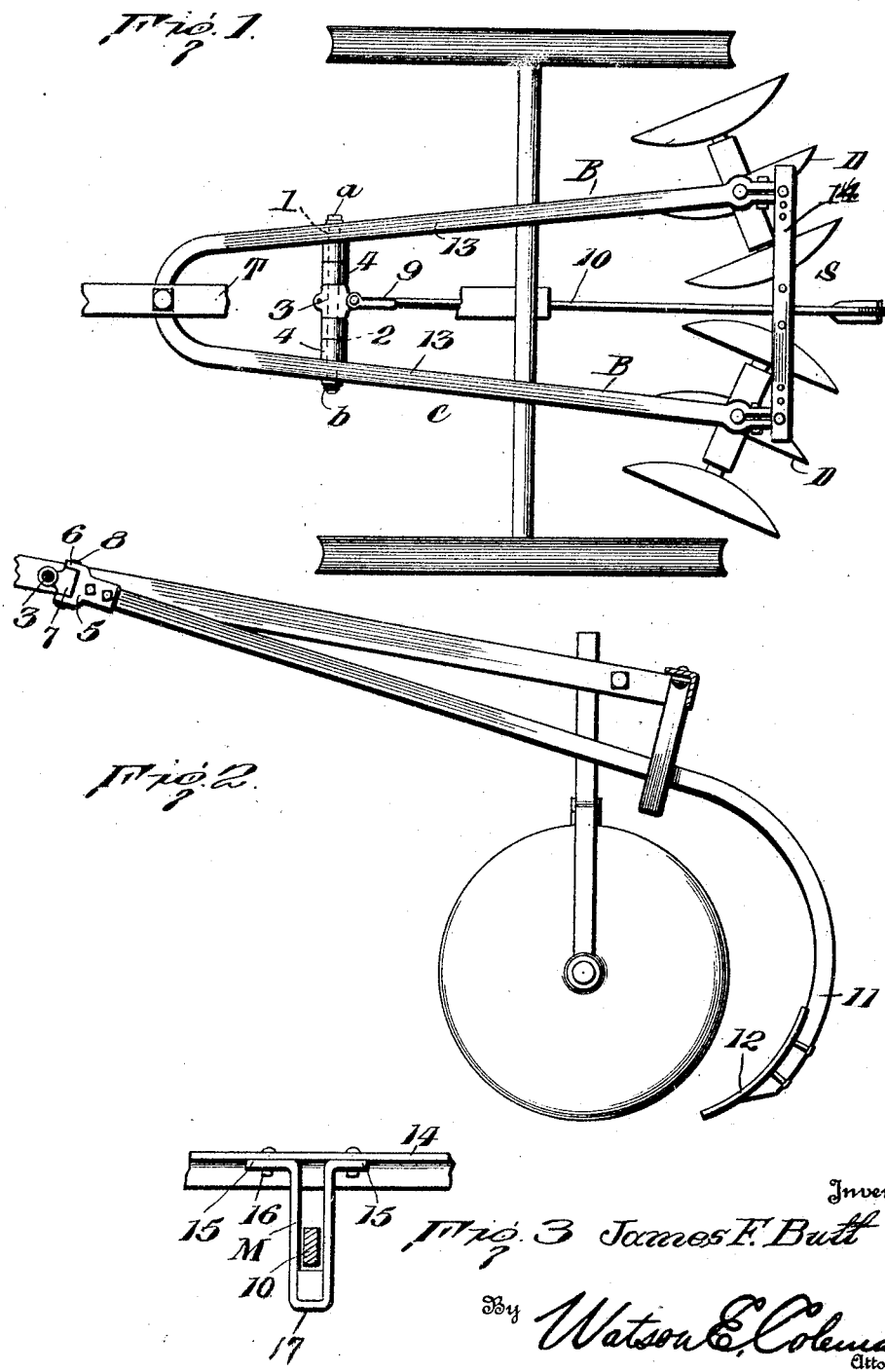

JAMES F. BUTT, OF HERTFORD, NORTH CAROLINA.

CULTIVATOR ATTACHMENT.

1,367,767.  Specification of Letters Patent.  Patented Feb. 8, 1921.

Application filed August 11, 1920. Serial No. 402,762.

*To all whom it may concern:*

Be it known that I, JAMES F. BUTT, a citizen of the United States, residing at Hertford, in the county of Perquimans and State of North Carolina, have invented certain new and useful Improvements in Cultivator Attachments, of which the following is a specification, reference being had to the accompanying drawings.

This invention relates to certain improvements in cultivator attachments and has relation more particularly to an attachment of this general character especially designed and adapted for use in connection with a disk cultivator, and it is an object of the invention to provide a novel and improved attachment which can be readily and conveniently applied in working position and which operates to work the portion of the ground or soil between the disk gangs and in such a manner whereby an effective marking is produced which may be employed with facility and to advantage in planting or for properly distributing fertilizer.

The invention consists in the details of construction and in the combination and arrangement of the several parts of my improved cultivator attachment whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view in top plan illustrating a cultivator attachment constructed in accordance with an embodiment of my invention.

Fig. 2 is a fragmentary view partly in side elevation and partly in section of the structure as illustrated in Fig. 1, and Fig. 3 is an enlarged fragmentary view partly in front elevation and partly in section illustrating the regulating member herein embodied.

As disclosed in the accompanying drawings, C denotes a cultivator preferably of a wheeled or riding type and which includes the rearwardly directed beams B having their forward end portions operatively connected in a conventional manner with the rear portion of the tongue T of the cultivator.

Carried by the rear or lower end portion of each of the beams B is a disk gang D of any ordinary or preferred construction and which is operated in the various well known manners. Coacting with the beams B is a spreader S of any desired character.

The forward end portions of the beams B are provided with the substantially horizontally disposed openings 1 through which are directed the opposite end portions of a rod 2, preferably including a head $a$ at one end and a retaining or holding nut $b$ engaged with the opposite end, so that the rod 2 is effectively held against displacement. The rod 2 is also directed through a tubular member or barrel 3 which, when in applied position, is arranged at a point substantially midway between the beams B and in longitudinal alinement with the space between the opposed or inner ends of the disk gangs D. The member or barrel 3 is maintained in its desired position upon the rod 2 preferably through the instrumentality of the washers 4 or the like arranged at opposite sides of said member or barrel 3 and substantially filling the space between the ends of said barrel or member 3 and the adjacent portions of the beams B.

The barrel or member 3 at substantially its longitudinal center is provided with the rearwardly directed and substantially vertically disposed web 5 provided at its upper and lower end portions with the vertically spaced knuckles or bearings 6 between which snugly engages a vertically disposed barrel 7.

Disposed through the knuckles or bearings 6 and the vertically disposed barrel 7 is a pin 8 whereby the barrel 7 is pivotally supported by the web 5. The barrel 7 is normally held against swinging or rotary movement by frictional contact of the opposite ends thereof with the opposed faces or surfaces of the knuckles or bearings 6. However, upon exerting sufficient pressure upon the barrel 7, the same may be rotated or rocked as the requirements of practice may necessitate.

The barrel 7 is formed with or carried by the end portion of a substantially horizontally disposed plate 9 which is bolted or otherwise secured to the end portion of a beam 10. The beam 10 is of sufficient length to have its rear end portion terminate a slight distance rearwardly of the opposed ends of the disk gangs D and said beam is also in alinement with the space between said disk gangs. The rear end portion of the beam 10 terminates in a depending sheth or stock 11 and suitably engaged with the forward face of said sheth or stock 11 is a ground working member or hoe 12, the working end portion of which extends a desired distance below the lower end of the sheth or stock 11.

Bolted or otherwise secured to the rear end portions of the beams B are the opposite end portions of a cross member 14. Vertically disposed through the central portion of the cross member 14 are the free extremities of the side members or arms 15 of a U-shaped member M and engaged with the upper extremities of said side members or arms 15 are the bolts 16 whereby the member M is anchored to the cross member 14. The beam 10, hereinbefore referred to, passes between the side members or arms 15 with the base or central portion 17 arranged therebelow. The contact of the beam 10 with the base or central portion 17 serves to limit the downward movement of the beam 10 and consequently the extent of penetration of the ground working member or hoe 12. While this limit of downward movement may be regulated or adjusted as desired by bodily raising the U-shaped member M, it is preferred that this regulation be accomplished by applying blocks or shims between the base or intermediate portion 17 of the member M and the beam 10.

With my improved attachment applied as hereinbefore described, it will be readily seen that the same will at all times move with the beams B carrying the disk gangs D so that my improved attachment at all times will be in a position to successfully accomplish its purposes.

From the foregoing description it is thought to be obvious that a cultivator attachment constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a cultivator including beams adapted to carry ground working members, a beam positioned between said first named beams and extending rearwardly thereof, means for pivotally supporting the forward end portion of the second named beam by the first named beams, a ground working member carried by the opposite end portion of the second named beam, the pivotal connection of the second named beam permitting said second named beam to have swinging movement independently of the first named beams, and means for limiting the downward movement of the second named beam, said means being adjustable.

2. In combination with a cultivator including beams adapted to carry ground working members, a beam positioned between said first named beams and extending rearwardly thereof, means for pivotally supporting the forward end portion of the second named beam by the first named beams, a ground working member carried by the opposite end portions of the second named beam, the pivotal connection of the second named beam permitting said second named beam to have swinging movement independently of the first named beams, a cross member connecting the rear end portions of the first named beams, and a loop member depending from said cross member and through which the second named beam is freely directed, said loop member being of a length to permit the second named beam to have limited vertical swinging movement independently of the first named beams.

In testimony whereof I hereunto affix my signature.

JAMES F. BUTT.